United States Patent
Thirumalai et al.

(10) Patent No.: US 10,204,121 B1
(45) Date of Patent: *Feb. 12, 2019

(54) SYSTEM AND METHOD FOR PROVIDING QUERY RECOMMENDATIONS BASED ON SEARCH ACTIVITY OF A USER BASE

(71) Applicant: Amazon Technologies, Inc., Reno, NV (US)

(72) Inventors: Srikanth Thirumalai, Clyde Hill, WA (US); Trevor Emerson Hill, Arnold, MD (US)

(73) Assignee: Amazon Technologies, Inc., Reno, NV (US)

( * ) Notice: Subject to any disclaimer, the term of this patent is extended or adjusted under 35 U.S.C. 154(b) by 313 days.

This patent is subject to a terminal disclaimer.

(21) Appl. No.: 14/082,994

(22) Filed: Nov. 18, 2013

Related U.S. Application Data

(63) Continuation of application No. 13/180,230, filed on Jul. 11, 2011, now Pat. No. 8,589,429.

(51) Int. Cl.
*G06F 17/30* (2006.01)
(52) U.S. Cl.
CPC .............. *G06F 17/30321* (2013.01)
(58) Field of Classification Search
CPC ......... G06F 17/30864; G06F 17/30672; G06F 17/30631; G06F 7/08; B62B 5/0096
USPC ....................................................... 707/766
See application file for complete search history.

(56) References Cited

U.S. PATENT DOCUMENTS

| | | | |
|---|---|---|---|
| 6,415,282 B1 | 7/2002 | Mukherjea et al. | |
| 7,185,001 B1* | 2/2007 | Burdick et al. | |
| 7,194,454 B2 | 3/2007 | Hansen et al. | |
| 7,603,367 B1* | 10/2009 | Kanter | G06F 17/30 |
| 7,647,312 B2 | 1/2010 | Dai | |
| 2003/0014399 A1 | 1/2003 | Hansen et al. | |
| 2005/0187925 A1 | 8/2005 | Schechinger et al. | |

(Continued)

OTHER PUBLICATIONS

Bernard J Jansen, Danielle L Booth, Amanda Spink, "Patterns of Query Reformulation During Web Searching", Journal of the American Society for Information Science and Technology 2009, pp. 1358-1371.

(Continued)

*Primary Examiner* — Cheyne D Ly
(74) *Attorney, Agent, or Firm* — Robert C. Kowert; Meyertons, Hood, Kivlin, Kowert & Goetzel, P.C.

(57) ABSTRACT

Embodiments may include a system configured to receive search session data that indicates, for each of multiple search sessions performed by a respective user, multiple search queries submitted by that user during the search session. The system may also receive search selection data that indicates, for each of multiple search queries resulting in a set of search results, a particular item selected from that set of search results by a respective user. The system may be configured to perform a co-occurrence analysis on the search data in order to generate one or more search indices that specify, for a given search query, one or more search queries determined to be related to the given search query according to the co-occurrence analysis. The system may be configured to process a client request for related queries that are related to a query of interest submitted by the user within that request.

19 Claims, 13 Drawing Sheets

(56) References Cited

U.S. PATENT DOCUMENTS

| | | | |
|---|---|---|---|
| 2006/0095345 A1* | 5/2006 | Ka | G06Q 30/0603 705/26.62 |
| 2006/0161520 A1 | 7/2006 | Brewer et al. | |
| 2007/0282811 A1* | 12/2007 | Musgrove | 707/3 |
| 2008/0059420 A1* | 3/2008 | Hsu | G06F 17/30631 |
| 2012/0203772 A1 | 8/2012 | Cucerzan et al. | |
| 2012/0330971 A1* | 12/2012 | Thomas | G06F 17/30663 707/748 |

OTHER PUBLICATIONS

Reiner Kraft, Jason Zien, "Mining Anchor Text for Query Refinement", WWW2004 May 17-22, 2004, New York, New York, pp. 1-9.

Tessa Lau, Eric Horvitz, "Patterns of Search: Analyzing and Modeling Web Query Refinement", Jun. 1999, pp. 1-10.

Soo Young Rieh, Hong Xie, "Patterns and Sequences of Multiple Query Reformulations in Web Searching: A Preliminary Study" Proceedings of the 64th ASIST Annual Meeting, 38, 2001, pp. 246-255.

Mark Sanderson, Susan Dumias "Examining Repetition in User Search Behavior" ECIR 2007 pp. 597-604.

Zhang et al., WI/VW 2006, May 22-26, 2006, Edinburgh, Scotland, pp. 1-2.

Loren Baker, Search Engine Journal, User-Guided Search Refining in Google, Oct. 7, 2004, p. 1.

\* cited by examiner

SYSTEM AND METHOD FOR PROVIDING QUERY RECOMMENDATIONS BASED ON SEARCH ACTIVITY OF A USER BASE

This application is a continuation of U.S. application Ser. No. 13/180,230, filed Jul. 11, 2011, now U.S. Pat. No. 8,589,429, which is hereby incorporated by reference in its entirety.

BACKGROUND

Merchants that operate network-accessible marketplaces may maintain electronic catalogs that include thousands of items (or more) offered for sale. These electronic catalogs often include item detail pages accessible through one or more networks (e.g., web pages accessible over the Internet). These item detail pages often include descriptive information (e.g., text descriptions, pictures or video) in order to assist a buyer in determining whether an item is worth purchasing. The merchant may index this descriptive information in order to expose search functionality to customers. For instance, a customer may enter one or more keywords into search component provided by the merchant, such as a search box or widget on the merchant's website. The merchant may process the query and provide one or more search results to the customer. Typically, the quality of these search results will be dependant at least in part on the quality of the customer's search query. For instance, vague or short queries may result in a quantity of search results that is too large to be helpful to the user. Similarly, overly specific queries may result in too few search results.

Furthermore, identifying features of different products may be useful for categorizing and/or searching for items. While merchants may receive some general information and/or marketing information about items from item suppliers (or other sources, such as manufacturers), this information may in many cases fail to explicitly enumerate the relevant features of the items. As feature sets may vary widely among different product types, evaluating this information to identifying these features is not an insignificant undertaking in some cases, particularly for large electronic catalogs with information for many different items.

BRIEF DESCRIPTION OF THE DRAWINGS

FIG. 9B illustrates an example display of a search refinement component configured as part of network portal interface display, according to some embodiments.

FIG. 9C illustrates another example display of a search refinement component configured as part of network portal interface display, according to some embodiments.

Figure 1:
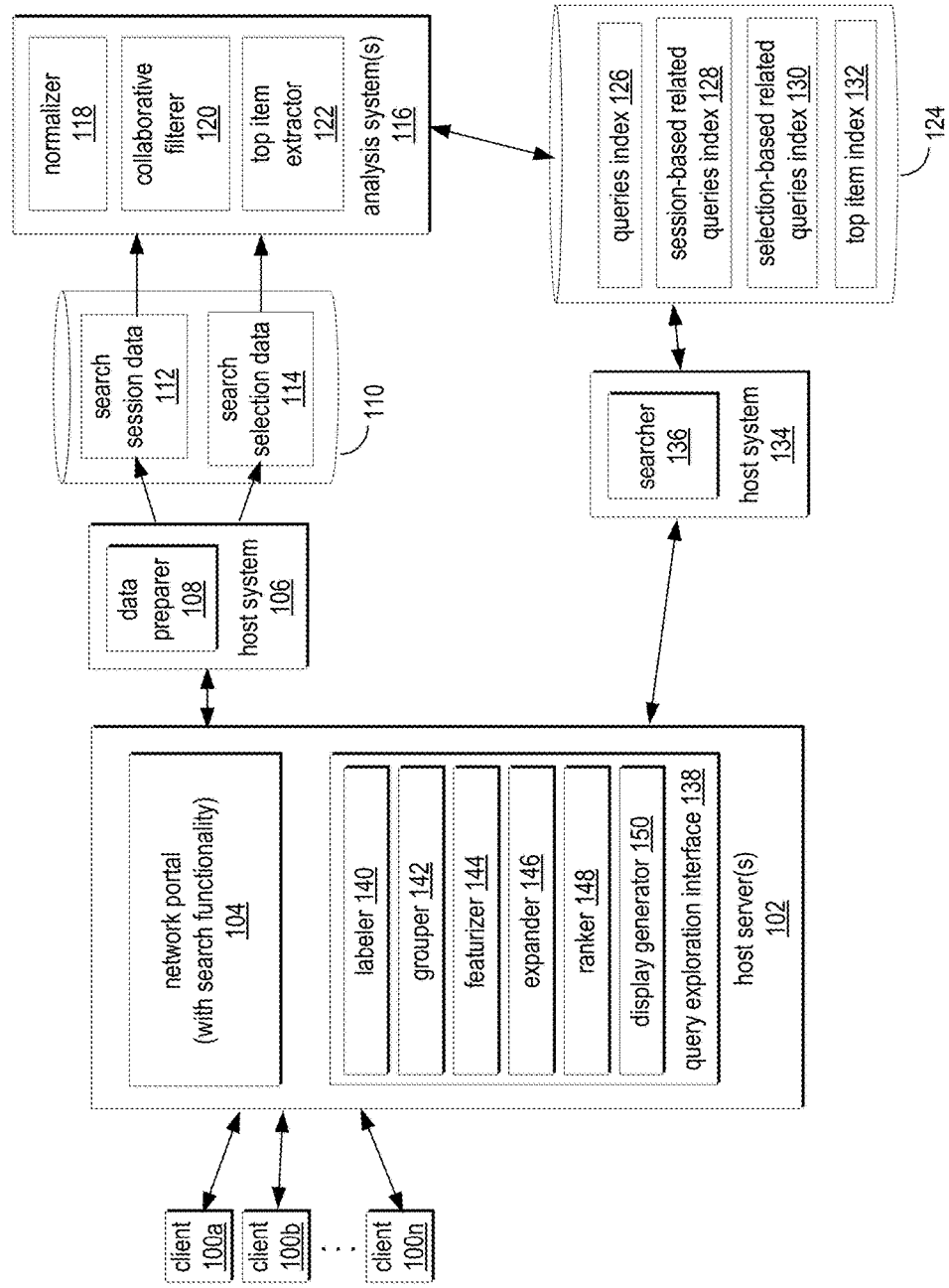
FIG. 1 illustrates an example system configuration configured to implement embodiments of the system and method for providing query recommendations based on search activity of a user base, according to some embodiments.

While the system and method for providing query recommendations based on search activity of a user base is described herein by way of example for several embodiments and illustrative drawings, those skilled in the art will recognize that the system and method for providing query recommendations based on search activity of a user base is not limited to the embodiments or drawings described. It should be understood, that the drawings and detailed description thereto are not intended to limit the system and method for providing query recommendations based on search activity of a user base to the particular form disclosed, but on the contrary, the intention is to cover all modifications, equivalents and alternatives falling within the spirit and scope of the system and method for providing query recommendations based on search activity of a user base as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various embodiments of a system and method for providing query recommendations based on search activity of a user base are described. Embodiments may be configured to capture information about the search activity of a user base and utilize this information to provide query suggestions to users. The information about the search activity of the user base may include search session data, which may indicate, for each of multiple search sessions, the queries that a respective user submits during a particular search session. One characteristic exhibited by many search sessions is refinement. For instance, a user may start a session with a first query and, after viewing the corresponding search results, submit a new query in order to further refine the search results. In one non-limiting example, a user may search for "desk lamp" and, after being presented with a broad list of search results, submit a second query for "LED desk lamp" in order to narrow the search results for a desired item. As described in more detail below, embodiments may infer a relationship between queries that are submitted during the same session. Generally, the more instances in which two queries appear during the same session, the stronger the relationship between those queries. In one non-limiting example, if "desk lamp" and "led desk lamp" appeared together in 100 search queries while "desk lamp" and "light bulb" appeared together in only 10 search queries, embodiments may infer that the relationship between "desk lamp" and "led desk lamp" is stronger than the relationship between "desk lamp" and "light bulb." As described in more detail below, embodiments may utilize this type of analysis to provide query suggestions to users of a search component, such as a search component of an electronic commerce portal or a separate portal for exploring related search queries. In one non-limiting example, if a user searches for "desk lamp," embodiments may provide a recommendation to use the query "led desk lamp" or some other query determined to have a relationship with the query "desk lamp."

Another type of information about the search activity of a user base may include search selection data. Search selection data may include, for each query of multiple queries performed over some time period, a respective search result selected by a user. In various embodiments, a user selection of a search result may indicate, at least to some degree, that the search was a success (e.g., successful enough to draw the user's interest to that search result). For instance, a user's selection of a search result may generally indicate that a stronger relationship exists between the respective query and that search result than a relationship between that query and any search results that were not selected. Similarly, as a user base of users performs different searches over time, different queries may result in the selection of the same search result. For instance, in one non-limiting example, the queries "LED bulb" and "LED light" may both yield search results that include a "high-efficiency LED light bulb" result. If users of the "LED bulb" query and users of the "LED light" query both select the "high-efficiency LED light bulb" search result with some degree of statistical significance, embodiments may include determining that a relationship exists between these two queries. Generally, the more search results that two queries share in this manner, the stronger the relationship between those queries. As described in more detail below, embodiments may utilize this type of analysis to provide query suggestions to users of a search component, such as a search component of an electronic commerce portal or a separate portal for exploring related search queries.

In various embodiments, the techniques described above may be utilized to evaluate the search session data and/or the search selection data to generate, for each of multiple search queries, one or more related search queries. Embodiments may also evaluate related search query information to identify features of different item types. In one non-limiting example, embodiments may include performing a textual analysis on an item type (e.g., an item type expressed as a search query) and its respective set of related queries in order to determine the features of that item type. This process is described in more detail below with respect to the featurizer component.

FIG. 1 illustrates an example system configuration configured to implement embodiments of the system and method for providing query recommendations based on search activity of a user base, according to some embodiments. In various embodiments, one or more host server(s) 102 may be configured to provide a network portal to one or more clients 100a-n. The network portal may provide any of a variety of content to clients including but not limited to content of an electronic commerce portal or electronic marketplace. As illustrated, the network portal may include search functionality for searching multiple items through the network portal. For instance, clients may visit the network portal with a web browser and search for items to purchase from among multiple items indexed by a search component. The network portal may return a listing of search results, such as a web page of hyperlinks to item detail pages that include details about various items (e.g., text, pictures, video, audio or other information descriptive of an item) offered in commerce (e.g., offered for sale, trade, etc.). A user may select a particular search result in order to view the respective item detail information. In various embodiments, the network portal may also include functionality for carrying out a transaction for an item, such as an electronic shopping cart and/or checkout process.

Host system 106 may include a data preparer component 108. The data preparer may be configured to collect search session data 112 and/or search selection data 114 and store such information within data store 110. Search session data may indicate, for each of multiple search sessions, the queries that a respective user submits during a particular search session. For instance, data preparer 108 may monitor search sessions between clients 100 and network portal 104 and log such sessions within search session data 112. For instance, for a given session, search session data 112 may store all the queries (e.g., one or more keywords or phrases) for which a user searched during a session. In various embodiments, a session may be any specified period of time, such as a particular hour, day or some other time period. In some embodiments, a session may be defined by the time between when a user logs on to a customer account and when a user logs out of the customer account. In some cases, sessions may be tracked by "cookie" files on clients 100 or through some other means of storing session information. In any case, search session data may store information about multiple sessions for multiple different users. (Note that in various embodiments the queries of any single session will typically be associated with the same client or user.)

Search selection data may include, for each query of multiple queries performed over some time period (e.g., days, weeks, months, etc.), a respective search result selected by a user. For instance, the network portal may, in response to a query (e.g., one or more keywords or phrases) from one of the clients, generate a search results list that is provided to the querying client. In response the client (e.g., the user of the client) may submit to the network portal a selection of one (or more) of the search results. This information may be collected by data preparer 108 and stored within search selection data 114.

Figure 2:
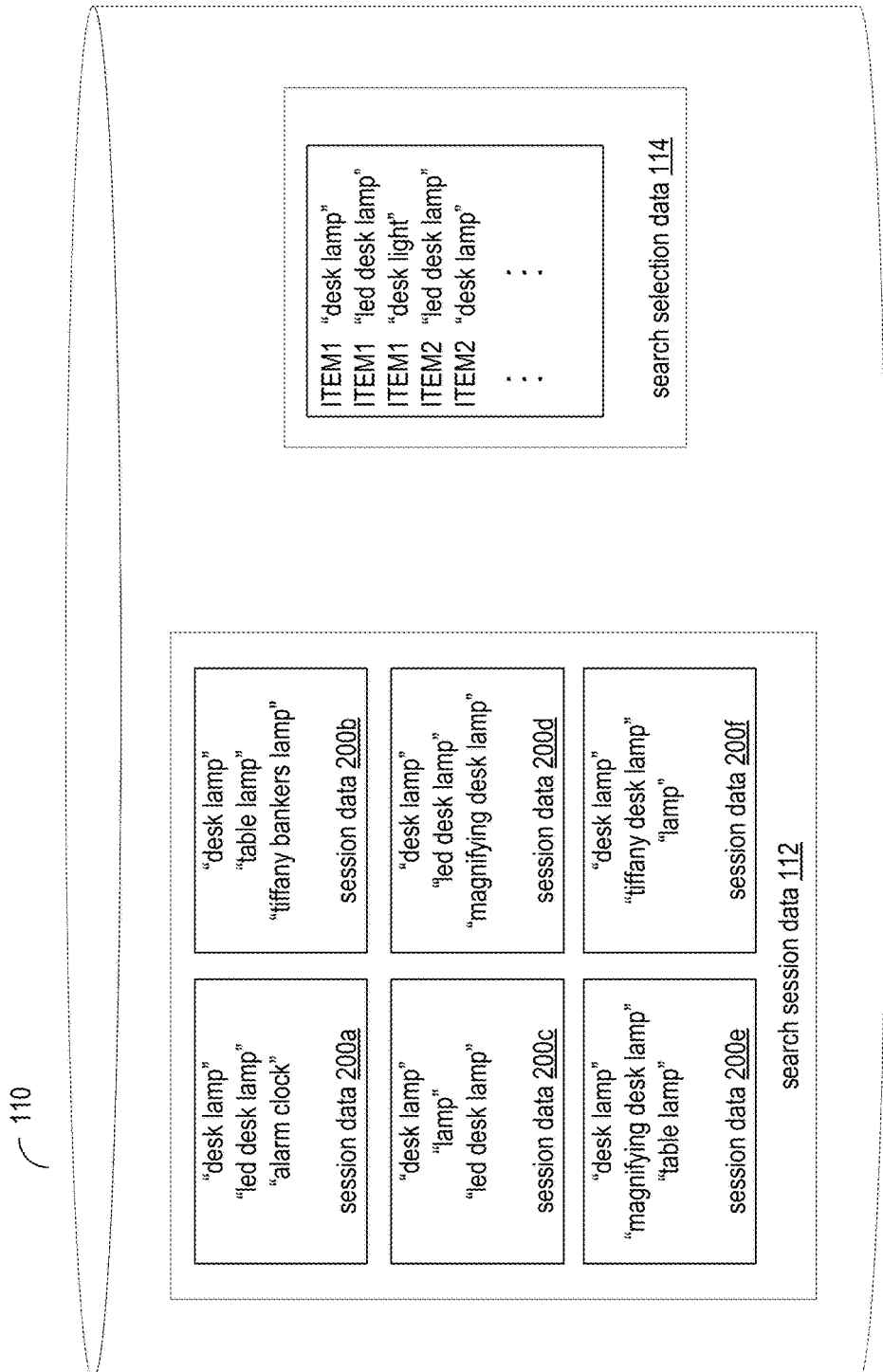
FIG. 2 illustrates a block diagram including example search session data and example search selection data, according to some embodiments.

FIG. 2, which is described collectively with FIG. 1 herein, illustrates a block diagram including example search session data and example search selection data, according to some embodiments. As illustrated, search session data 112 may include portions of session data 200a-f, each of which corresponds to a particular session carried out between a client and the network portal. In the illustrated embodiment, each portion of session data includes three search queries generally related to lamps. However, in various embodiments, a given session may include any number of queries related to any number of topics or items. Also illustrated, search selection data 114 may include, for each query of multiple queries performed over some time period (e.g., days, weeks, months, etc.), a respective search result selected by a user. In various embodiments, the search paths that different users (or even the same user in some cases) take (e.g., the keywords that a user enters) to find the same item may be different. As illustrated, one user searched for "desk lamp" and chose the search result corresponding to the item having identifier "ITEM1." Another user (or possibly the same user) may have searched with a different query (e.g., "led desk lamp") and subsequently selected the same item (e.g., the item having identifier "ITEM1"). As described above, in various embodiments, a relationship may be inferred between two (or more) queries when those queries share an item in this manner. Generally, the more items shared between queries in this manner, the stronger the relationship between the queries.

In various embodiments, search session data 112 and search selection data 114 may be evaluated by collaborative filterer 120 and/or top item extractor 122. However, in many embodiments, search session data 112 and search selection data 114 may be normalized by normalizer 118 before such data is evaluated by collaborative filterer 120 and/or top item extractor 122.

Figure 3A:
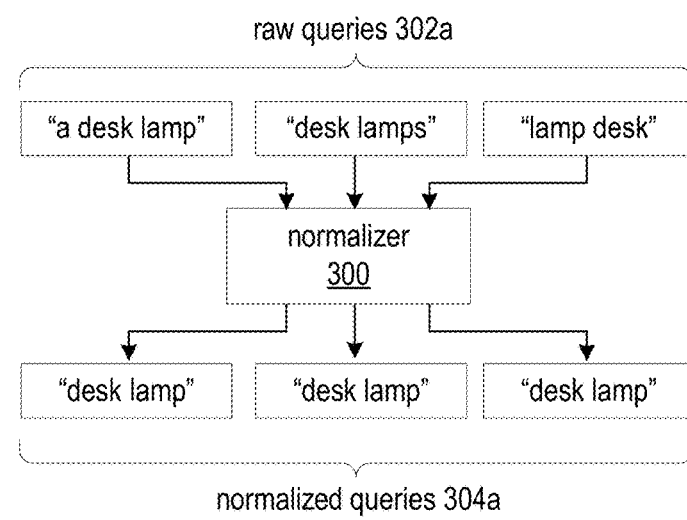
FIGS. 3A-3B, illustrate example techniques for normalizing search session data and/or search selection data, according to some embodiments.
Figure 3B:
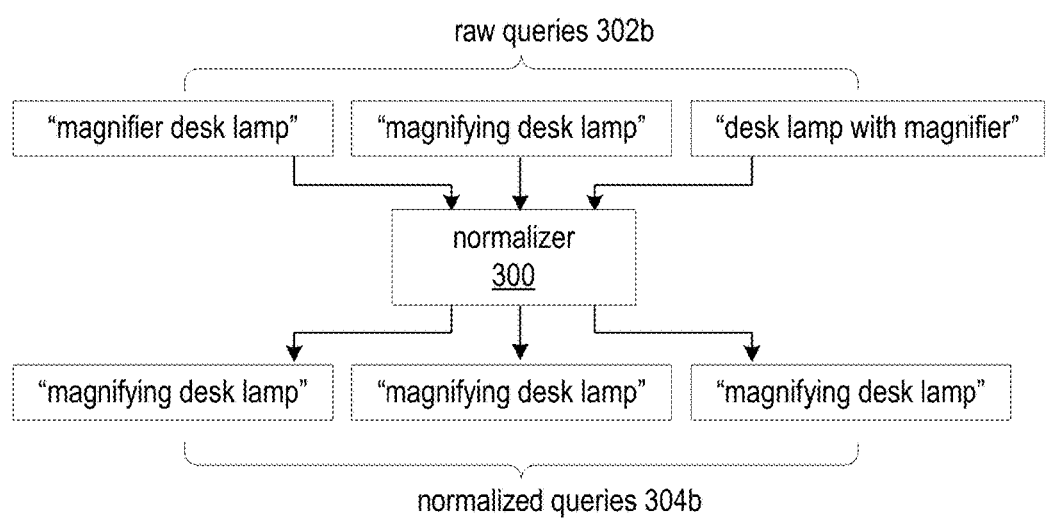

FIGS. 3A-3B, which is also described collectively with FIG. 1 herein, illustrates an example technique by which the normalizer normalizes search session data 112 and/or search selection data 114 (e.g., before such data is analyzed by analysis system(s) 116). In FIG. 3A, the normalizer is presented with three raw queries 302a (e.g., queries submitted by clients 100) that textually represent the same search query. In the illustrated example, these raw queries are "a desk lamp," "desk lamps," and "lamp desk." In various embodiments, the normalizer may evaluate each distinct raw query to determine its frequency across all submitted queries. The normalizer may select the query that occurs most often and designate that query as representative of the group of raw queries. As illustrated, normalizer 300 modifies all of raw queries 302a to normalized queries 304a, each of which are modified to "desk lamp." In this example case, the normalized queries are changed to "desk lamp" because the normalizer determines that the raw query "desk lamps" occurs most often. Additionally, in some cases (as is the case here), the normalizer may apply one or more rules to the final normalized queries, such as singularizing all the terms (e.g., "desk lamps" becomes "desk lamp"). FIG. 3B illustrates a similar example beginning with different raw queries. In FIG. 3B, the normalizer is presented with three raw queries 302b (e.g., queries submitted by clients 100) that textually represent the same search query. In the illustrated example, these raw queries are "magnifier desk lamp," "magnifying desk lamp," and "desk lamp with magnifier." In various embodiments, the normalizer may evaluate each distinct raw query to determine its frequency across all submitted queries. The normalizer may select the query that occurs most often and designate that query as representative of the group of raw queries. As illustrated, normalizer 300 modifies all of raw queries 302b to normalized queries 304b, each of which are modified to "magnifying desk lamp." In this example case, the normalized queries are changed to "magnifying desk lamp" because the normalizer determines that the raw query "magnifying desk lamp" occurs most often.

Figure 4:
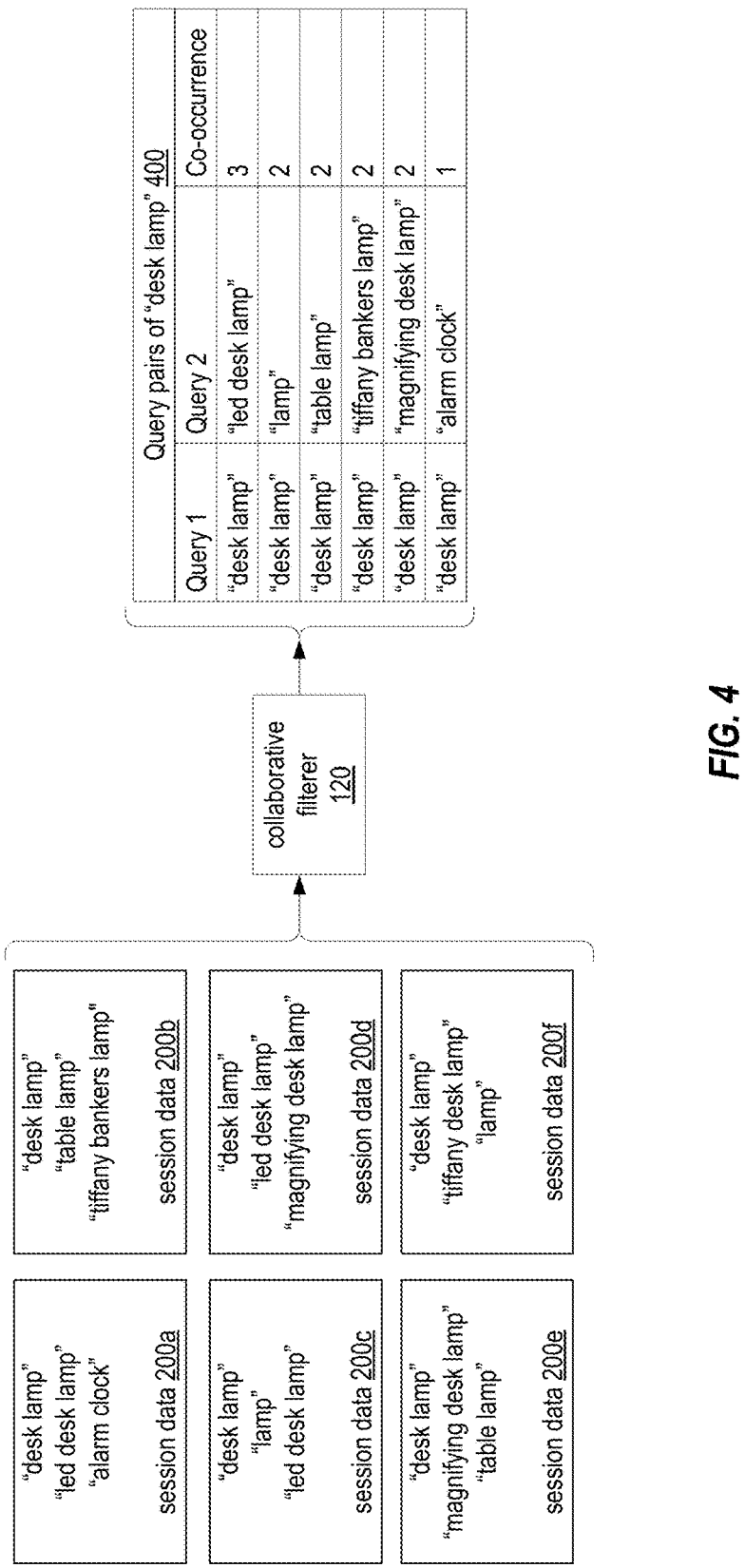
FIG. 4, illustrates a collaborative filterer performing a co-occurrence analysis on example session data, according to some embodiments.

In FIG. 1, analysis system(s) may be configured to evaluate the data of data store 110 in order to generate the indices of data store 124. For instance, collaborative filterer 120 may be configured to analyze search session data 112 and/or search selection data 114 to generate indices in data store 124. For example, the collaborative filterer may perform a co-occurrence analysis on search data 112 to generate session-based related queries index 128. FIG. 4, which is described collectively with FIG. 1 herein, illustrates collaborative filterer 120 performing a co-occurrence analysis on example session data 200a-f of search session data 112 to generate table 400 specifying co-occurrence values for different query pairs. In the illustrated embodiment, collaborative filterer 120 may determine (e.g., count or otherwise quantify) the number of times that each distinct pair of queries occurs together within the same session. This property may be referred to as co-occurrence and is generally indicative of the relationship between queries. For instance, the more often that two queries co-occur, the stronger the relationship between those queries. In one non-limiting example, "desk lamp" and "led desk lamp" co-occur much more frequently than "desk lamp" and "pizza oven." In this way, it may be inferred that the relationship between "desk lamp" and "led desk lamp" is stronger than the relationship between "desk lamp" and "pizza oven" (e.g., to the extent that such relationship between "desk lamp" and "pizza oven" even exists). In the illustrated example "desk lamp" and "led desk lamp" co-occur more frequently than any other pair of queries (three times in this example, as illustrated by the co-occurrence value of 3). Accordingly, in accordance with various embodiments, it may be inferred that the relationship between the query "desk lamp" and the query "led desk lamp" is stronger than any other pair evaluated in the illustrated embodiment. This property may be utilized to generate session-based related queries index 128, as described in more detail below. Also illustrated, the query pairs formed by "desk lamp" and each of "lamp," "table lamp," "tiffany bankers lamp," and "magnifying desk lamp" each co-occur within a session twice. As such, each of those query pairs is illustrated as having a co-occurrence of 2 within table 400. The final pair in this example, "desk lamp" and "alarm clock," co-occur only once. As such, the corresponding co-occurrence value in table 400 is 1.

Furthermore, in various embodiments, collaborative filterer 120 may be configured to ignore data for certain search sessions. For example, if a search session contains more than a particular quantity (e.g., a configurable quantity) of search queries, the collaborative filter may be configured to ignore that session data for the purposes of the analysis described herein. In one non-limiting example, collaborative filterer 120 may be configured to ignore data of search sessions containing more than 20 queries. In various embodiments, these techniques may improve the quality of the search session data as, in some cases, the more search queries performed within a given search session, the higher the probability that at least some queries within that search session are unrelated.

Collaborative filterer 120 may be configure to utilize the co-occurrence values of table 400 to determine which pairs of queries should be designated as being related (e.g., designated within session-based related queries index 128). For instance, collaborative filterer 120 may utilize the illustrated co-occurrence values to distinguish which pairs of queries are to be designated within index 128 as being related. In some embodiments, collaborative filterer 120 may apply a minimum threshold co-occurrence value to the query pairs. (This threshold may be configurable.) For example, if collaborate filterer 120 were to apply a minimum threshold co-occurrence value of 2, then all of the illustrated query pairs in the table, except for "desk lamp" and "alarm clock" (co-occurrence value of 1), would be designated within index 128 as being related. In another example, if collaborate filterer 120 were to apply a minimum threshold co-occurrence value of 3, then of the illustrated query pairs in the table only "desk lamp" and "led desk lamp" would be designated within index 128 as being related. In various embodiments, session-based related queries index 128 may store information that indicates, for each query within the index, one or more other queries that are designated as being related. As described in more detail below, this may enable the index to be queried with a specific query and in response provide a list of all queries that are related to that specific query.

Collaborative filterer 120 may be configured to evaluate search selection data 114 in a similar manner in order to generate selection-based related queries index. For instance, with reference to FIG. 4, instead of each portion of data corresponding to a session including multiple queries, each portion of data 200*a-f* may correspond to a particular search result, which may be a particular item, such as embodiments in which network portal 104 is a commerce-based interface that offers that item for sale. In this configuration, instead of indicating the number of instances in which queries appear in the same search session, the co-occurrence values may indicate the number of search results (e.g., items) that each query pair shares. For instance, if search selection data 114 indicates that a pair of queries resulted in the selection of a common search result (e.g., an item offered for sale through the network portal), collaborative filter 120 may count this as one co-occurrence. The application of thresholds to the co-occurrence data for search selections may be similar to that described above with respect to table 400. This threshold analysis may be utilized by the collaborative filter in order to identify pairs of queries that are related. Furthermore, in various embodiments, selection-based related queries index 130 may store information that indicates, for each query within the index, one or more other queries that are designated as being related. As described in more detail below, this may enable the index to be queried with a specific query and in response provide a list of all queries that are related to that specific query.

Furthermore, in various embodiments, collaborative filterer 120 may be configured to ignore some queries in the search selection data for various items. For example, in various embodiments, the collaborative filter may be configured to consider only a certain quantity of the most popular search queries for a given item. In one non-limiting example, for a given search result (e.g., a given item), collaborative filterer 120 may be configured to consider only the top 50 most-used queries that result in a selection of that search result. In various embodiments, these techniques may improve the quality of the search session data as, in some cases, less-popular queries may not be as indicative of positive relationships between items.

In various embodiments, another queries index 126 may be generated that includes all queries for which related queries have been identified (e.g., using any or all of the techniques described above). Furthermore, in various embodiments, queries index 126 may store information that indicates, for each query within the index, one or more other queries that are designated as being related. As described in more detail below, this may enable the index to be queried with a specific query and in response provide a list of all queries that are related to that specific query.

Top item extractor 122 may also evaluate the search data of data store 110 to generate a top item index 132. For example, as described above, search selection data 114 may indicate, for a given query, which (if any) search result (e.g., an item offered in commerce) was selected after the search results for that query were provided to the client. The top item extractor may evaluate multiple ones of such query-item pairs to determine, for a given query, the most common items that were selected from the search results of that query. For instance, in one non-limiting example, top item extractor 122 may generate top item index 132 such that, for each given query of multiple search queries, indicates the top three search results from the search results provided in response to the given query.

In various embodiments, in addition to storing entries of queries and related queries, the indices of data store 124 may also store rankings of related items (e.g., stronger relationships between a query and related queries are ranked higher than weaker relationships between that query and one or more other queries. In various embodiments, analysis system(s) 116 may generate these rankings based on a query frequency (how often the queries are utilized by the user base), co-occurrence (see e.g., co-occurrence of FIG. 4), and/or pointwise mutual information (PMI). For the top item index, top search results for respective queries may also be ranked according to at least some of these techniques.

In various embodiments, any index of data store 124 may be updated by analysis system(s) 116 on a period or aperiodic basis. For instance, new search session data 112 and/or new search selection data 114 may be evaluated. Analysis system(s) 116 may update the indices of data store 124 accordingly based on the updated data. Furthermore, searcher component 136 may serve as search interface between other systems (e.g., host server(s) 102) and the indices of data store 124. For instance, searcher 136 may be configured to receive a request that specifies one (or more) of the indices of data store 124 as well as particular query. For indices 126-130, search may perform a lookup operation with that particular query to determine which, if any, queries are related to the particular query as specified by the respective index. Once the one or more related queries are found, searcher component 136 may respond to the requester with a list of one or more queries that are related to the particular query specified in the original request. In some embodiments, if multiple related queries are returned, the search component may also return a score or other indication to indicate the strength of the relationship between the returned queries and the query specified in the index request.

In FIG. 1, host server(s) 102 may also be configured to implement a query exploration interface 138 that is accessible to clients 100*a-n*. Generally, the query exploration interface 138 may enable clients to provide a query of interest, such as a query for which the client desires additional information. In response to the query of interest, the query exploration interface 138 may provide the client with information and insight into the search behavior of other users that have used that query or similar queries. For example, in response to a client submitting a query, the query exploration service may be configured to communicate with searcher to retrieve information about other queries related to the query provided by the client. Examples of this information may include, for the query of interest, one or more other queries that are related to the query of interest; subsequent Figures describe other types of information about the query of interest. This query exploration interface may provide at least some of that information to the requesting client. As described in more detail below, the query exploration interface may provide other types of information to the client, as described in more detail below.

Figure 5:
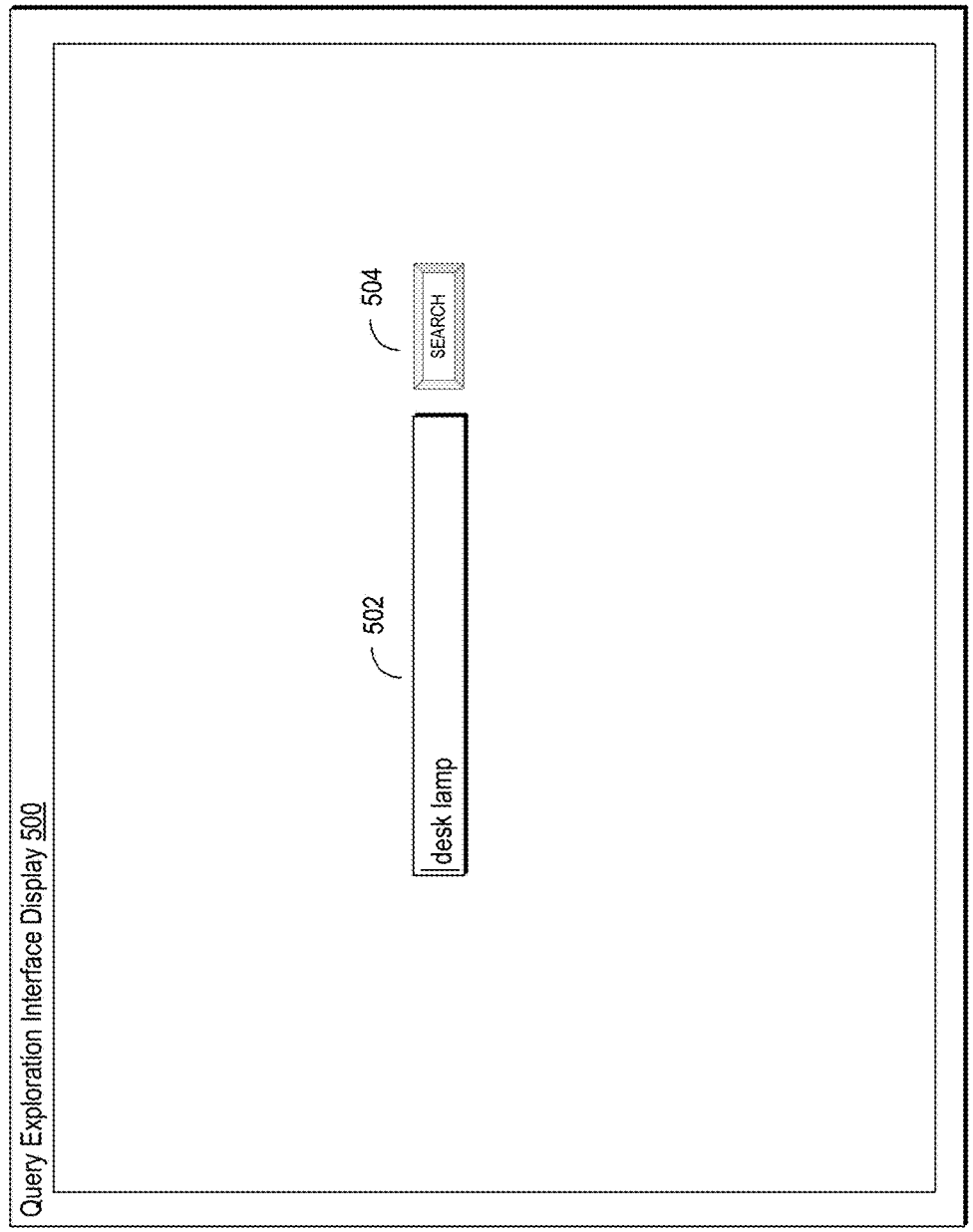
FIG. 5 illustrates an example display of a query exploration interface described herein, according to some embodiments.

FIGS. 5-8, which are collectively described herein with FIG. 1, illustrate example displays of the query exploration interface described herein. In various embodiments, the query exploration interface may be exposed to clients 100 using one or more of these displays or similar displays. In various embodiments, these query exploration displays may be generated by display generator 150 of the query exploration interface 138. FIG. 5 illustrates an example query exploration interface display 500. In various embodiments, query exploration interface display 500 may serve as a home page or initial starting point of the query exploration interface accessible to multiple clients. A text entry field or "search box" 502 may accept a search query for which a client is requesting additional information. Control 504 may be selected to begin the search for additional information about any query entered into field 502. This display may be generated by display generator 150 in various embodiments. In some embodiments, query exploration interface 138 may receive input from client system (e.g., via field 502 and control 504) and provide to the client a response that includes information about the submitted query (e.g., related search queries for the submitted query, such as FIG. 7 described below). In other cases, the query exploration interface may first provide a one or more query suggestions, such as within a display similar to that illustrated in FIG. 6.

Figure 6:
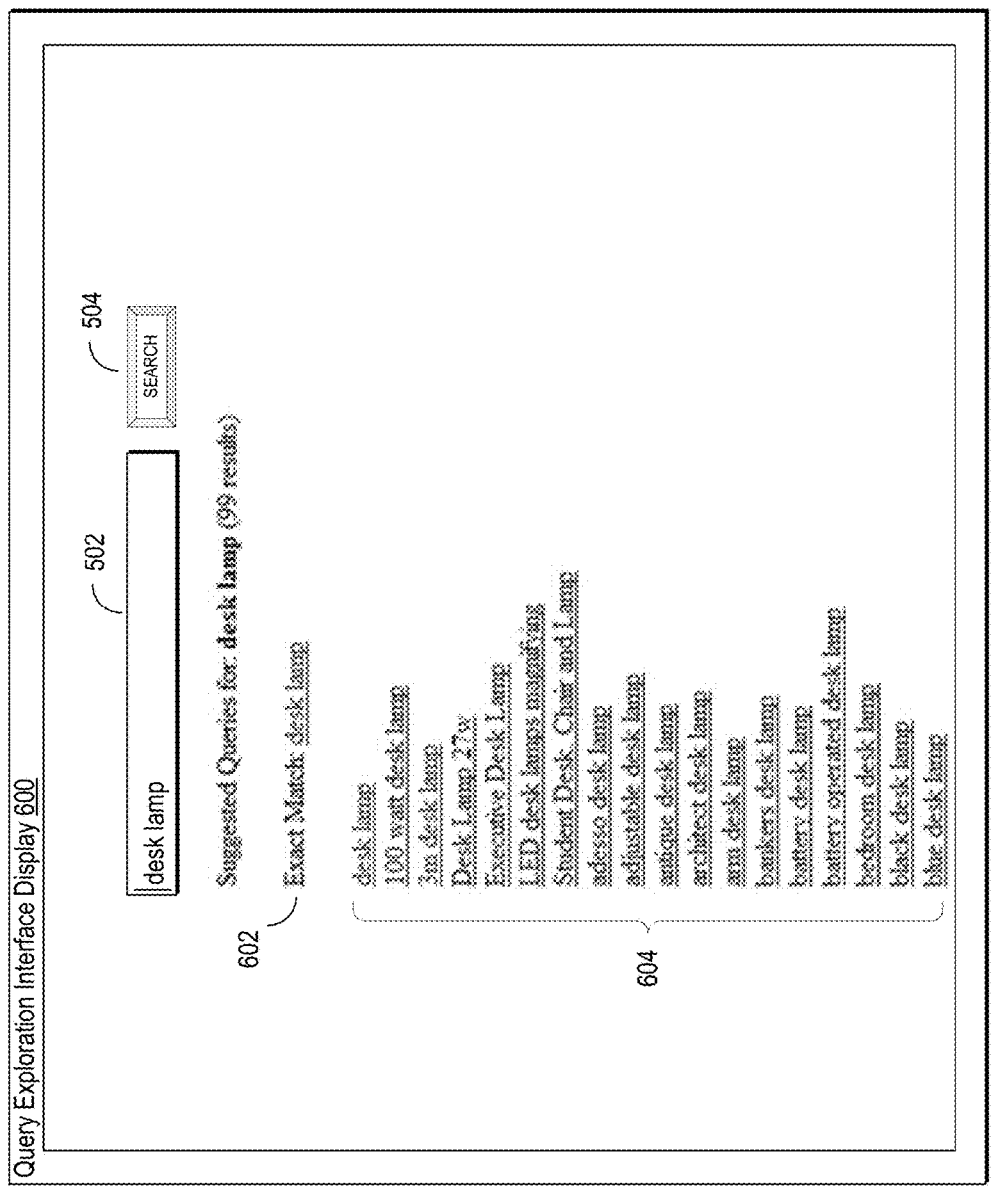
FIG. 6 illustrates another example display of a query exploration interface described herein, according to some embodiments.

FIG. 6 illustrates another example query exploration interface display, according to various embodiments. In various embodiments, providing clients with suggested queries may present a user with query suggestions that are appealing to users, but which the user may not have originally thought to search for through the query exploration interface. In the illustrated embodiment, a client may have submitted a "desk lamp" query (e.g., as in FIG. 5). In response, query exploration interface 138 may search for this query within queries index 126. For instance, the query exploration interface may provide searcher 136 with a request that specifies the "desk lamp" query of interest. In response, search 136 may search queries index 126 and return results to query exploration interface 138. These results may specify information including but not limited to an indication of whether there was an exact match for the query of interest and/or one or more suggested queries that have been determined to be related to the query of interest (e.g., in accordance with the techniques described above for generating search queries index 126). In the display interface of FIG. 6, there is an exact match for the original query of interest, as illustrated by exact match 602. In other cases, dependent on the particular query submitted by the client, there may not be an exact match 602. In either case (e.g., exact match or no exact match), query exploration interface display 600 may include one or more suggested queries 604. If the user of the respective client is satisfied with the exact match (if an exact match is present), the user may submit via the client an indication that the exact match should be searched for. Alternatively, the user of the respective client may select one of the suggested queries 604. For example, after viewing the listing of suggested queries, the user may feel that one of the suggested queries may yield better results. In any case, either an exact match or one of the suggested queries may be selected; the respective client may indicate which of these options is selected to the query exploration interface 138. The query exploration interface may send a request to searcher 136 in order to search one or more of indices 128-132. This information may be utilized to generate a query exploration interface display that includes results for the query of interest. These results may include, among other things, one or more related queries that are related to the query of interest, according to various embodiments. The various types of information that may be provided as results are described within the context of FIGS. 1 and 7 below.

Figure 7:
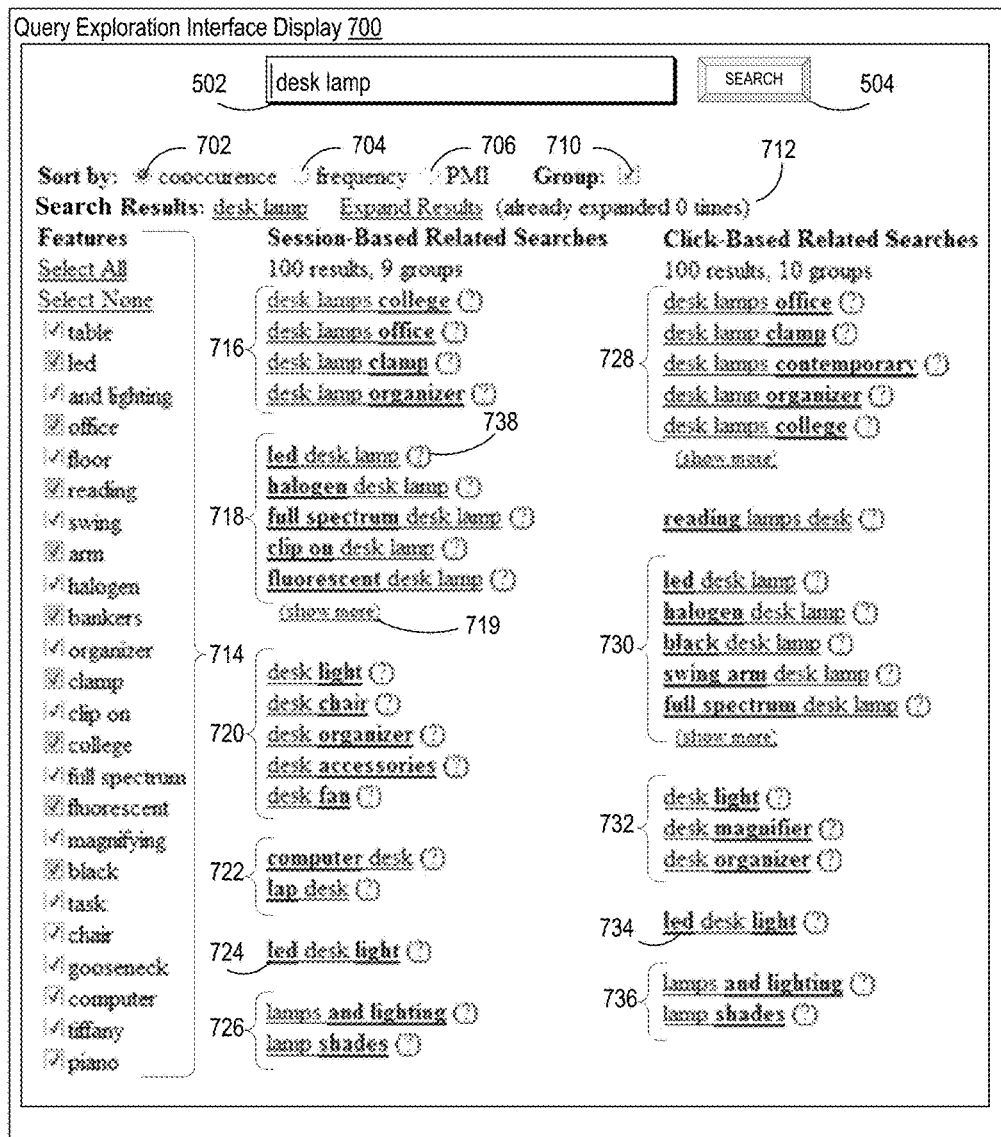
FIG. 7 illustrates another example display of a query exploration interface described herein, according to some embodiments.

FIG. 7 illustrates an example query exploration interface display that includes results for the query of interest (e.g., submitted via the interface display of FIG. 5 and/or FIG. 6), as described in more detail below. In various embodiments, different portions of the results information of this query interface display may be generated by different components of query exploration interface 138 of FIG. 1, which are described collectively with FIG. 7 below. In various embodiments, FIG. 1 illustrates an example labeler 140. Labeler 140 may be configured to, for a given query of interest, evaluate one or more related queries (e.g., related queries as indicated by session-based related queries index 128 and/or selection-based related queries index 130) to determine a relationship between the query of interest and the one or more related queries. For instance, the example query of interest may be "desk lamp" and one or more related queries may be "table lamp," "lamp," "led desk lamp," "tiffany bankers lamp," "magnifying desk lamp," and "alarm clock." The labeler may be configured to perform a textual analysis of this information to assign relationships between the query of interest and the one or more related queries. As an example, the labeler may assign a hierarchical relationship between the queries. For instance, the labeler may determine that the "table lamp" is a peer query to the "desk lamp" query of interest as the queries have different modifier words but share the same root word "lamp." The labeler may designate the "tiffany bankers lamp" as a peer query to the query of interest for similar reasoning. In another example, the labeler may designate the "lamp" query as a parent query as it shares the root word "lamp" but does not contain any additional modifiers. In another example, the labeler may designate the "led desk lamp" as a child query as it contains all words of the query of interest (e.g., "desk lamp") and at least one additional modifier (e.g., "led"). The labeler may also designate the "magnifying desk lamp" as a peer query to the query of interest for similar reasoning. In another example, the "alarm clock" query does not share any words with the "desk lamp" query of interest but none the less is designated as being related to the query of interest by one or more of the indices of data store 124. In this case, the labeler may designate the "alarm clock query" as being something different that does not have a strict placement within the hierarchical structure of the other labeled queries. In various embodiments, the aforesaid labeling techniques may be specified by one or more configurable rules utilized by labeler component 140. In various embodiments, other rules or labeling techniques may be utilized by the labeler in order to perform the labeling function. Generally, the labeler may be configured to categorize different queries based on their relationship with the query of interest. This categorization may but need not include structure information, such as the hierarchical structure of labeled queries described above. As described below, the labels (or "categories") determined by the labeler component may be utilized by grouper component 142 in various embodiments.

Grouper component may be configured to determine how queries that are related to the query of interest are to be graphically or visually grouped within the query exploration interface. For example, FIG. 7 illustrates different groups of queries 716-736 that are related to the "desk lamp" query of interest as specified by the indices of data store 124. In various embodiments, each group may correspond to a respective label or category specified by the labeler component, according to any of the techniques described above. In one non-limiting example, query group 718 may be a group of nodes having a child relationship with the "desk lamp" query of interest. While the illustrated embodiment does not explicitly include the corresponding label of each group in query exploration interface display 700, some embodiments may do so. For instance, query group 718 may be visually or graphically labeled as "child" queries within query exploration interface display 700. Irrespective of whether implicit or explicit labels are used, this grouping may assist a user or customer in determining the relationship of the queries to the original query of interest. In various embodiments, a particular group of related queries may attract the user's attention. In this case, the user of a client may select a control of the query exploration interfaced display in order to view additional queries of that group. For instance, in response to a user selection of control 719, the query exploration interface may provide additional search queries having a child relationship with the original query of interest. In some cases, other non-hierarchical grouping techniques may be utilized, such as by grouping the related queries on the basis of textual similarity (e.g., the degree to which queries have common terms) and/or text alignment (e.g., the degree to which queries share a common ordering of terms). Any of these grouping techniques may in various embodiments assist users in locating queries of interest that are more pertinent to their searching objectives. Furthermore, as illustrated in FIG. 7, the query exploration interface display may include different related queries based on results from different query indices. For instance, groups 716-726 may be results from session-based related queries index 128 whereas groups 728-736 may be results from selection-based related queries index 130. Furthermore, in various embodiments, the grouping of queries within query exploration interface 700 may be toggled (e.g., turned on or off) with control 710.

In various embodiments, the groups of queries 716-736 that are related to the query of interest (e.g., "desk lamp" in the examples described herein) may be ranked according to one or more criteria. As described above, in addition to storing entries of queries and related queries, the indices of data store 124 may also store rankings of related items (e.g., stronger relationships between a query and related queries are ranked higher than weaker relationships between that query and one or more other queries. In various embodiments, these rankings may be based on a query frequency (how often the queries are utilized by the user base), co-occurrence (see e.g., co-occurrence of FIG. 4), and/or pointwise mutual information (PMI). In various embodiments, the particular ranking criteria utilized may be selected via one of controls, such as controls 702-706. In various embodiments, ranker component 148 of the query exploration interface may be configured to determine these rankings form the indices of data store 124. In various embodiments, for each given one of related query groups 716-736, ranker component 148 may order the queries of that group in a particular order of rank according to the rankings received from one or more indices of data store 124. In one non-limiting example, consider related query group 716 of FIG. 7; ranker component 148 may order the queries of this group in descending order of rank. In this example, "desk lamps college" is illustrated as the highest ranked related query in group 716. In various embodiments, this may also convey that, within group 716, "desk lamps college" is the most likely to be related to the "desk lamp" query of interest. Likewise, "desk lamps office" may be the second ranked query within group 716, and so on.

In various embodiments, query exploration interface 138 may also be configured to expose one or more features for query searches. These features may, for example, include a list of features determined to be relevant to the class of items that includes the query of interest and a set of its related queries. An example listing of these features is illustrated in FIG. 7 as feature list 714. In various embodiments, the feature list may serve as a search refinement tool. For instance, features of this feature list may be selected by a user of a client in order to scope the results for a given query of interest. For instance, the "halogen" feature could be deselected in order to remove related queries that include "halogen" from consideration. In various embodiments, featurizer 144 of the query exploration interface may be configured to generate a given feature list that is displayed by the query exploration interface for a given query of interest.

To determine a list of features for a given query of interest (e.g., "desk lamp" in the illustrated embodiments), featurizer 144 may be configured to first determine a set of related queries that are related to the query of interest. For instance, featurizer 144 may determine this set of related queries by polling any of indices 126-130 for queries that are related to the query of interest. The featurizer may evaluate a set of queries that includes the query of interest and the queries determined from the indices. The featurizer may then order the queries from this set in order of their use across the user base. For instance, a non-limiting example ordered set (in descending order of use) may include the queries of the following list: lamp, led desk lamp, desk lamp (e.g., the query of interest in the examples described herein), acme and becker halogen desk lamp, acme and becker, house of lights desk lamp. The featurizer may be configured construct a dictionary of known features and use this dictionary to process the set of related queries to extract features of the set. In one non-limiting example, the terms added first to the dictionary of known features may include one and two word phrases that exceed a frequency of occurrence threshold, which may be configurable. In this example, the phrases "lamp" and "desk lamp" may be added to the dictionary of known features. The featurizer may also add three word phrases that include either the words "and" or "or" as part of the phrase. In this example, this technique may result in "acme and becker" being added to the dictionary of known features. At this point, the dictionary of known features may include "lamp," "desk lamp," and "acme and becker." The featurizer may use this dictionary to process the set of related queries for any remaining unidentified features. In various embodiments, the featurizer may evaluate the queries in order of descending use (e.g., more popular to less popular). Beginning with the first query, the featurizer may remove from consideration any phrase that is already contained within the dictionary of known features. After such phrases are removed from consideration, the featurizer may then add any remaining phrases to the dictionary of known features. Each query in the set of related queries may be processed in this manner. For instance, when "acme and becker halogen desk lamp" is evaluated by the featurizer, the phrases "acme and becker" and "desk lamp" have already been added to the dictionary of known phrases. In accordance with the techniques described above, the featurizer may remove these phrases from consideration. The remaining phrase, "halogen," may be added as a new feature to the dictionary of known features. The featurizer may process each query in the set of related queries in this manner in order to generate a completed dictionary of known features for this set. In various embodiments, features 714 of FIG. 7 may be features from such this type of completed dictionary.

As illustrated in FIG. 7, the query exploration interface display 700 may also include an expansion control 712 for expanding the current results. For instance, some queries of interest may yield few related queries. When expansion control 712 is selected, an expander 146 of the query exploration interface may generate a new, larger list of results by expanding the scope of the search. For instance, the expander component may search for related queries for the query of interest and any queries related to those related queries (e.g., as indicated by queries index 126). In other cases, the expander component may search for related queries of terms that are textually similar to the query of interest. In either case, the query exploration interface may then display this new, expanded list of results as part of a query exploration interface display.

Figure 8:
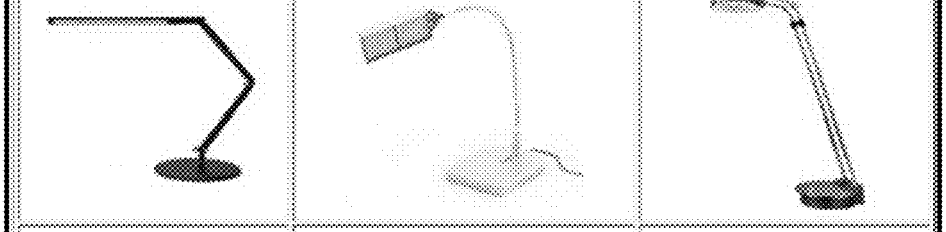
FIG. 8 illustrates another example display of a query exploration interface described herein, according to some embodiments.

As illustrated by top search results control 738, query exploration interface display may in various embodiments include, for any related search result of the display, a corresponding top search result control 738 for exposing the top search results of that search result. In various embodiments, the top search results for a given query may be helpful in determining whether that query is worth exploring further. FIG. 8 illustrates a query exploration interface display after the selection of top search result control 738. In the illustrated embodiment, query exploration interface 138 may generate graphical object 800, which may display the top historical search results for the query corresponding to top search result control 738 (e.g., "led desk lamp"). In various embodiments, a top search result may be a search result that is most often selected from a list of search results for a given query, information which query exploration interface 138 may determine from top item index 132 (either directly or through searcher 136). In the illustrated example, three example search results are displayed within graphical object 800. In other embodiments, other quantities of the n-most top search results may be displayed.

Applications of Related Queries

Figure 9A:
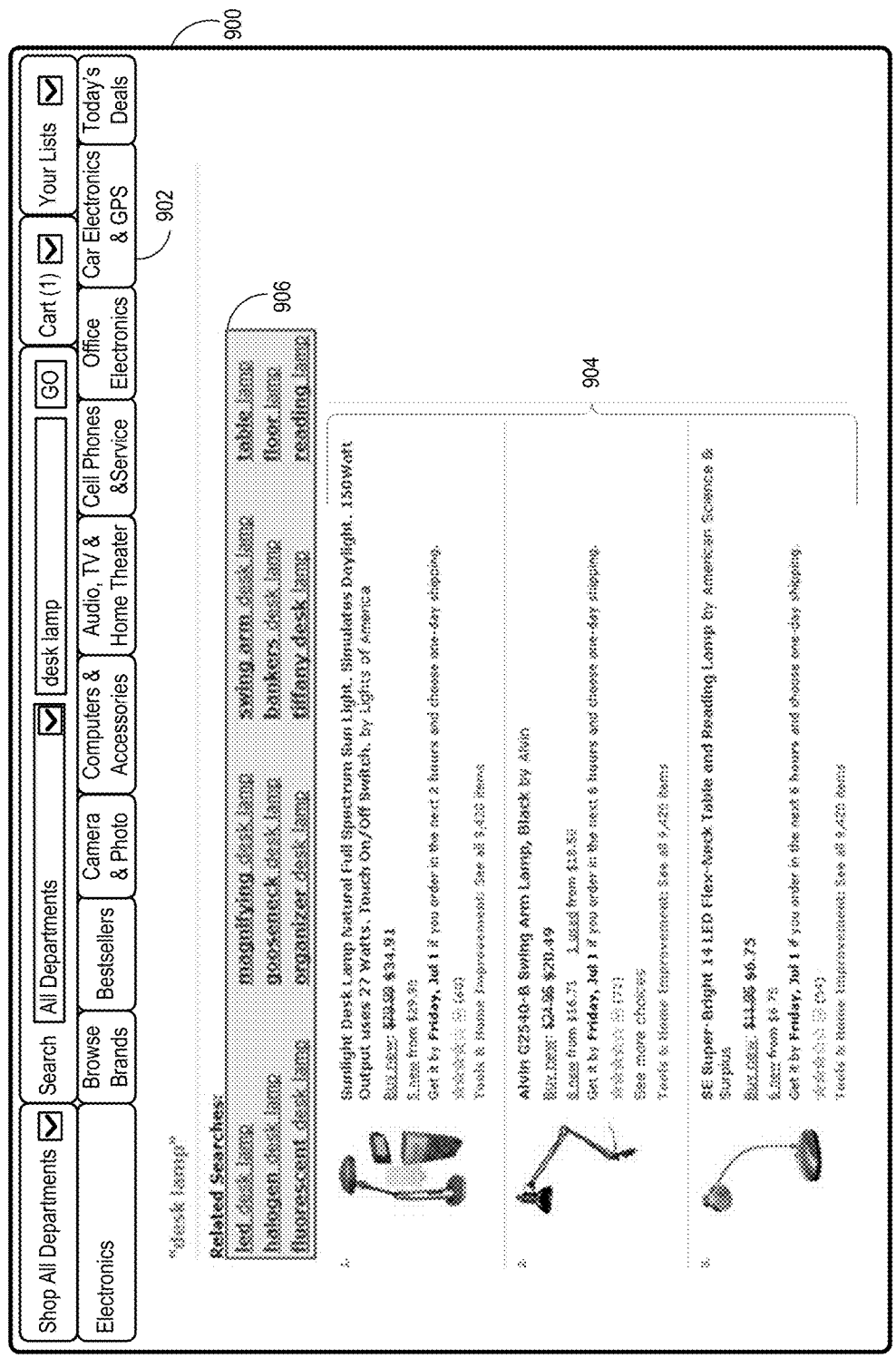
FIG. 9A illustrates an example display of a related searches component configured as part of network portal interface display, according to some embodiments.

In various embodiments, the functionality described herein need not be limited to a query exploration interface, such as that described above. For instance, in some cases, any of the above-described functionality may be implemented as part of network portal 104. FIG. 9A illustrates one example of a related searches component for use within a network portal. In the illustrated embodiment, a network portal display 900 may include one or more controls 902 for browsing the network portal and/or searching for items. In the illustrated example, a user has searched for "desk lamp" via a search box of the display. Furthermore, search results 904 display example search results corresponding to the search query "desk lamp." Additionally, the display may also include one or more related searches 906, which may be determined according to any of the techniques described herein. For example, related searches 906 may include queries determined to be related to the query of interest (e.g., the query "desk lamp" searched for in FIG. 9A) according to any of queries index 126, session-based related queries index 128, and/or selection-based related queries index 130. In many cases, if the user (e.g., a customer) is not satisfied with the initial search results 904 (which may in some cases stem from a sub-optimal initial search query), the user may select one of the queries of related searches 906 in order to target new results that may be more pertinent to the user's interests.

Figure 9B:
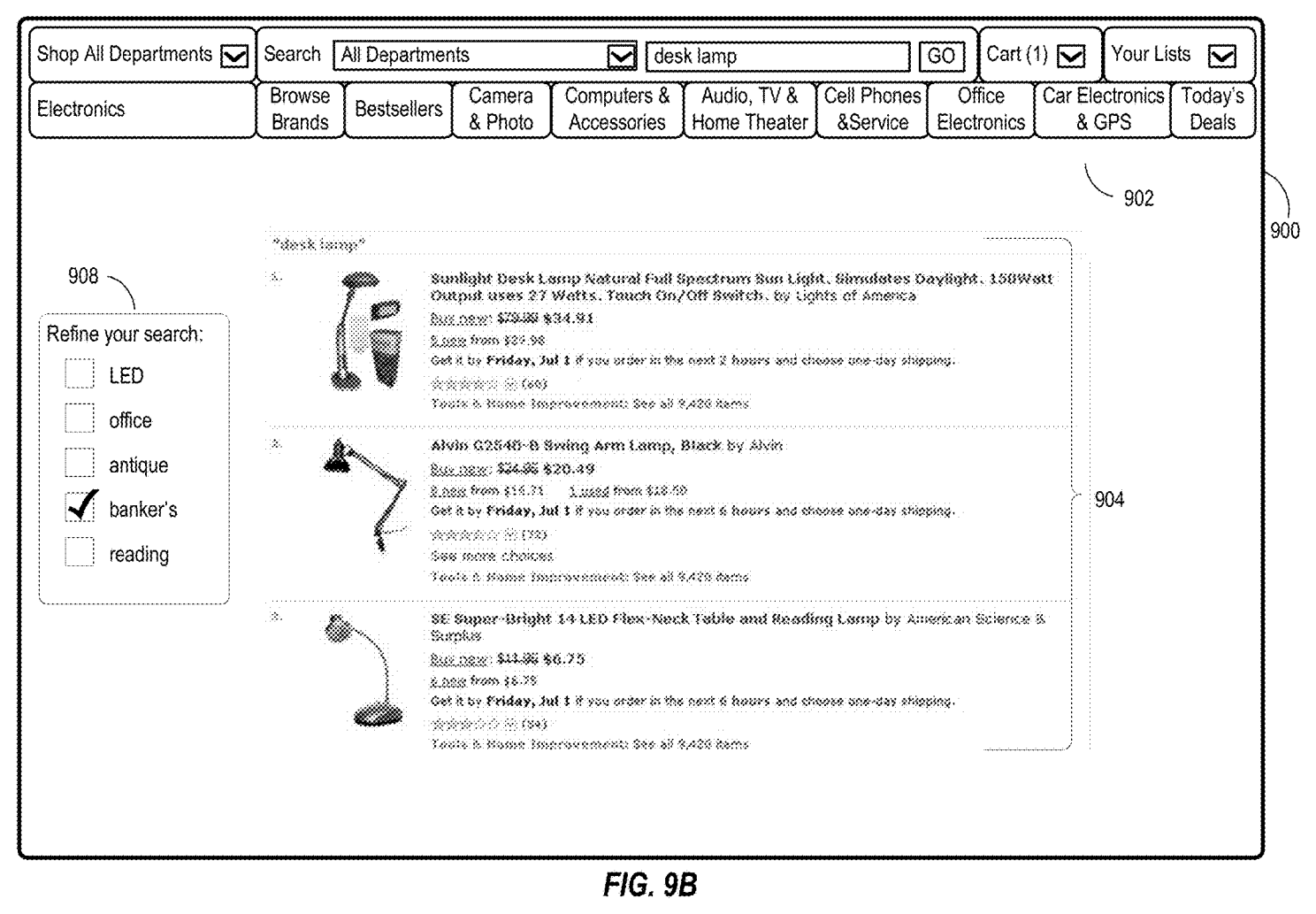
Figure 9C:
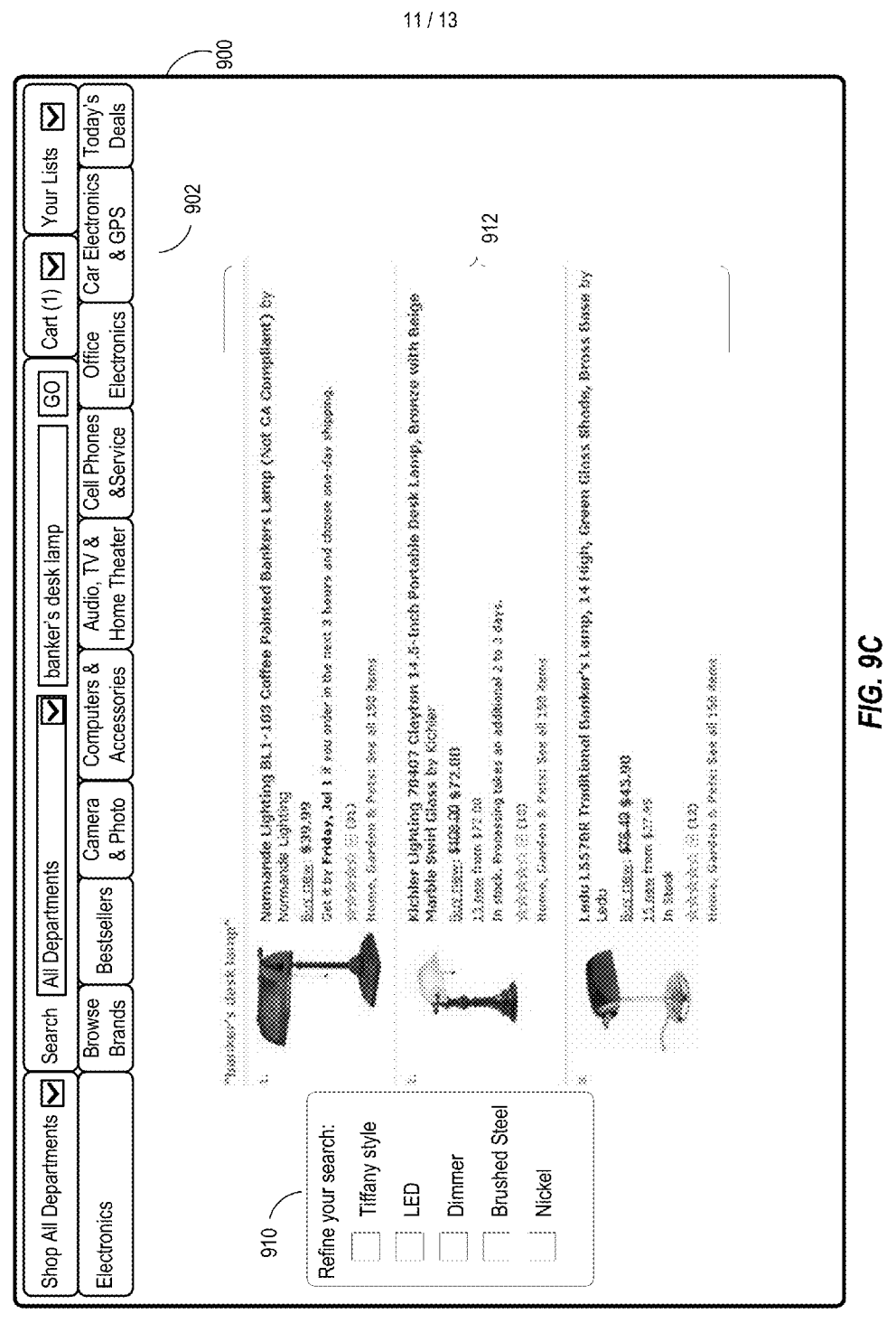

FIG. 9B illustrates a user-interface display that includes a search refinement tool according to various embodiments. In the illustrated embodiment, a network portal display 900 may include one or more controls 902 for browsing the network portal and/or searching for items. In the illustrated example, a user has searched for "desk lamp" via a search box of the display. Furthermore, search results 904 display example search results corresponding to the search query "desk lamp." Additionally, the display may also include a search refinement tool 908. The search refinement tool may list selectable features associated with the submitted query. For instance, in the illustrated example, search refinement tool 908 includes features associated with "desk lamp." In various embodiments, the features listed in the search refinement tool may be determined according to the techniques described above with respect to featurizer 144. These features may help a user of a remote client (e.g., a customer browsing for items) identify additional query terms that may be added to the original query in order to yield more pertinent search results. For instance, in the illustrated embodiment, the remote client performing the search may select the term "banker's" in order to search for banker's style desk lamps. In various embodiments, multiple terms may be selected from the search refinement tool. Embodiments may include appending the selected term or terms (in this case "banker's") to the original search query (in this case "desk lamp"). In response, embodiments may include performing a new search for the new combined query, which in this example is "banker's desk lamp." FIG. 9C illustrates a similar user interface display that includes a new search result list based on the selection of the term "banker's" in search refinement tool 908 of FIG. 9B. These updated search results are illustrated at 912. Furthermore, embodiments may also include generating an updated search refinement tool 910 that includes new search refinement terms for the updated query (e.g., for "banker's desk lamp"). In various embodiments, this process may be repeated until the user or customer is satisfied with the search results. Furthermore, in various embodiments, the user or customer's use of search terms provided through the search refinement tool may be utilized to improve the related query data of the search indices of data store 124. For instance, if users frequently select terms to accompany a given query, embodiments may infer and/or assign a stronger relationship between those terms and the given query.

In various embodiments, the related queries determined according to the techniques described herein may be also be utilized to discover relationships between entities. For example, the session-based related queries may in various embodiments yield relationships between entities including but not limited to brands, artists, authors and/or models within brands.

In various embodiments, the related queries determined according to the techniques described herein may also be utilized to facilitate the classification of products into new categories. For example, in some embodiments, items sold through network portal 104 may be categorized according to a hierarchy of nodes that each correspond to a respective class of items. For instance, the hierarchy of nodes may be one or more stored data structures that specify a node hierarchy including at least some nodes categorized under other nodes within the hierarchy. For instance, such a hierarchy may include a parent node encompassing all items in the product catalog. The parent node may have multiple second level nodes corresponding to broad product categories (e.g., apparel, electronics, sporting goods, etc.). These second level nodes may each have one or more children corresponding to subcategories and so on. In one non-limiting example, child nodes of the electronics node could include a laptop computer node and a television node. Generally, each node may correspond to the set of items categorized under that node and any child nodes extending from that node. In regard to the creation of a node (e.g., the process of designating items to a newly created node), one or more searches of the product catalog may be utilized to locate items for a given node. In various embodiments, related searches (e.g., similar to related searches 906 of FIG. 9A) could be utilized to locate additional items that should be added to a newly created node within the hierarchy of nodes.

In various embodiments, the related queries determined according to the techniques described herein may be utilized to improve keyword campaigns within network portal 104. For example, certain search queries may result in keyword campaigns that include a suggestion to search for a given query within a particular category of items, such as a particular node of the hierarchy of nodes described above. A non-limiting example of a campaign may include a suggestion to search for a "desk lamp" (the original query) within a "home and décor" category (the node from the hierarchy). By utilized the more accurate classifications described above with respect to the hierarchy of nodes, the accuracy of the campaigns may be also be improved. Furthermore, in some embodiments, campaigns for one query may also be extended to that query's related queries. For instance, a campaign for "desk lamp" could also be provided when "led desk lamp" is searched for.

In various embodiments, the related queries determined according to the techniques described herein may be utilized to enable a user to combine multiple searches together. For instance, consider related searches 906 of FIG. 9A. In some embodiments, one or more of those related searches may be selected and combined into a new search with the original query. For instance, the network portal may be modified to include a multi-selection tool for selecting or inputting multiple different searches at once. In one non-limiting example, in response to a selection of "led desk lamp" of the related searches, the search result list may be updated to reflect results for both "desk lamp" (e.g., the original query) and the newly selected "led desk lamp" query. In some embodiments, if a statistically significant portion of searches for "desk lamp" also result in the selection of "led desk lamp," these searches could be automatically merged for future searches thereby increasing the quality of search results provided to users.

In various embodiments, the related queries determined according to the techniques described herein may be utilized to provide keyword or phrase recommendations for keyword bidding. For instance, in some embodiments, keywords may be bid on by outside entities, such as for advertising or offering products through network portal 104. For example, such entities may desire for their advertisements or products to be displayed when a client searches for a particular keyword. The related queries information determined according to the techniques described herein may be utilized to create suggestions or recommendations of keywords or phrases that the entity may also have interest in bidding on. In one non-limiting example, an entity desiring to bid on the phrase "desk lamp" could be provided with a recommendation for bidding on the related phrase "led desk lamp."

In various embodiments, the related queries determined according to the techniques described herein may be utilized to improve the quality of search results for lengthy search queries, which may be referred to herein as "long tails." In various embodiments, due to their overly-specific nature, long tail search queries may yield few or no search results. To improve these search results, embodiments may automatically identify parent queries (e.g., queries with fewer words, as determined by labeler 140 described above) and provide results for those queries as well. In this way, the quantity of search results provided for long tail searches may be increased while maintaining at least some degree of relevance of the search results to the long tail query.

Example Method(s)

Figure 10:
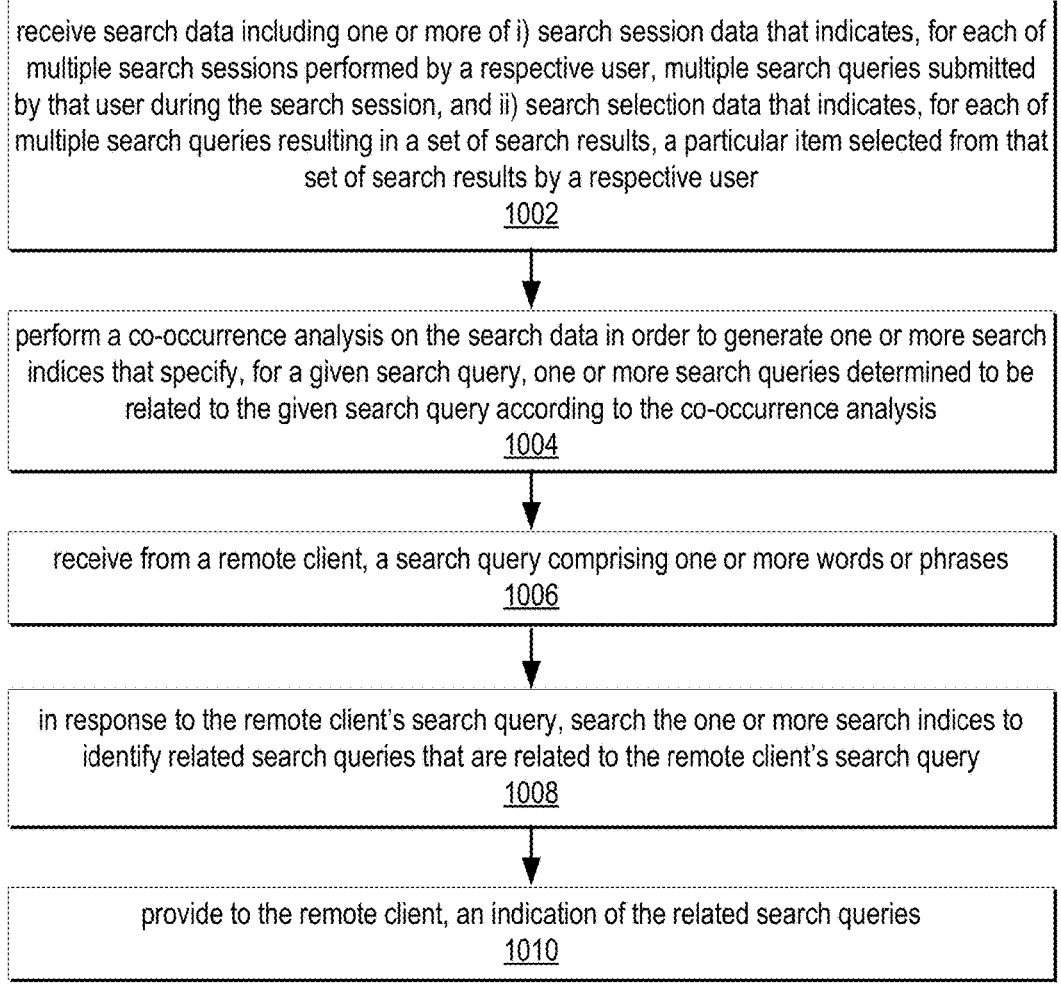
FIG. 10 illustrates a flowchart of an example method for generating and using search indices of related queries, according to some embodiments.

Various embodiments may include methods for identifying relating queries and/or generating search indices that store such information. In various embodiments, these methods, such as the example method of FIG. 10 described below, may be implemented by one or more computers, such as the computer system of FIG. 11. While FIG. 10 illustrates one example method for generating and using search indices of related queries, generally any of the actions described herein with respect to other Figures may be incorporated into the method, in some embodiments.

As illustrated at block 1002, the method may include receiving search data including one or more of i) search session data that indicates, for each of multiple search sessions performed by a respective user, multiple search queries submitted by that user during the search session, and ii) search selection data that indicates, for each of multiple search queries resulting in a set of search results, a particular item selected from that set of search results by a respective user. For example, receiving search data may include utilizing any of the techniques described herein to collect search session data 112 and/or search selection data 114.

As illustrated at block 1004, the method may also include performing a co-occurrence analysis on the search data in order to generate one or more search indices that specify, for a given search query, one or more search queries determined to be related to the given search query according to the co-occurrence analysis. For example, this portion of the method may include performing any of the techniques utilized by collaborative filterer 120 to perform a co-occurrence analysis session data 112 and/or search selection data 114. For instance, the method may include performing a co-occurrence analysis similar to that of FIG. 4 described above.

As illustrated at block 1006, the method may include receiving from a remote client, a search query comprising one or more words or phrases. For instance, this portion of the method may include receiving a search query through a query exploration interface, such as receiving the "desk lamp" query of FIG. 5 described above. In another example, this portion of the method may include receiving a search query through a network portal display (e.g., a display of an electronic marketplace), such as receiving the "desk lamp" query of FIG. 9A described above.

As illustrated at block 1008, the method may include, in response to the remote client's search query, searching the one or more search indices to identify related search queries that are related to the remote client's search query. For instance, this portion of the method may include searching session-based related queries index 128 and/or selection-based related queries index 130 in order to identify search queries that are related to the remote client's search query.

As illustrated at block 1010, the method may include providing to the remote client, an indication of the related search queries. For instance, this portion of the method may include providing to the remote client, a query exploration interface display that includes the related search queries, such as query exploration interface display 700 of FIG. 7 described above. In other example, this portion of the method may include providing to the remote client, a network portal display that includes a graphical indication of related queries, such as related queries 906 or search refinement tools 908-910 of network portal display 900 described above.

Example Computer System

Various embodiments of the system and method for providing query recommendations based on search activity of a user base, as described herein, may be executed on one or more computer systems, which may interact with various other devices. Note that any component, action, or functionality described above with respect to FIGS. 1-10 may be implemented on one or more computers configured as computer system 1100 of FIG. 11, according to various embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store program instructions 1122 and/or data 1132 accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions 1122 may be configured to implement any functionality of the system configuration illustrated in FIG. 1, for example. Additionally, data 1132 of memory 1120 may store any of the information or data structures described above, including but not limited to the information of data stores 110 and 124. In some embodiments, program instructions and/or data may be received, sent or stored upon different types of computer-accessible media or on similar media separate from system memory 1120 or computer system 1100. While computer system 1100 is described as implementing the functionality of functional blocks of previous Figures, any of the functionality described herein may be implemented via such a computer system.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1185, between nodes of computer system 1100, or between any element of FIG. 1. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

Figure 11:
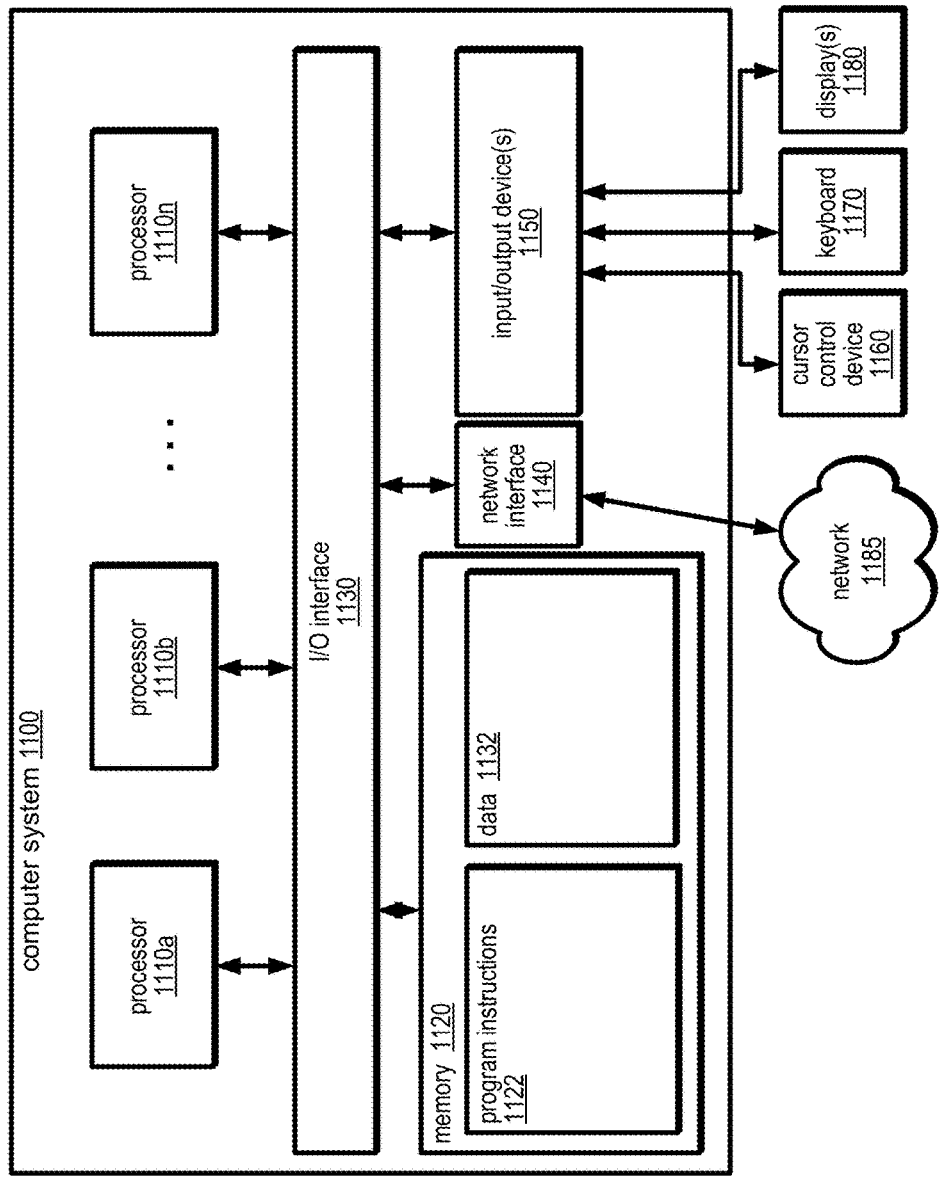
FIG. 11 illustrates one example of a computer system suitable for implementing various elements of the system and method for providing query recommendations based on search activity of a user base, according to some embodiments.

As shown in FIG. 11, memory 1120 may include program instructions 1122, which may be processor-executable to implement any element or action described above. In one embodiment, the program instructions may implement the methods described above, such as the example method illustrated by FIG. 10. In other embodiments, different elements and data may be included. Note that data 1132 may include any data or information described above.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

The invention claimed is:

1. A system, comprising:
one or more computers comprising one or more hardware processors and memory configured to:
receive, from a remote client, a search query for one or more items offered in commerce in an electronic marketplace;
in response to the receipt of the remote client's search query, identify one or more related search queries that are related to the remote client's search query;
generate a dictionary of item features that identifies product features of the one or more items based at least in part on a frequency of search queries for a particular item feature satisfying a frequency occurrence threshold, wherein the dictionary of item features is ranked based on corresponding frequencies of the search queries;
extract, from the dictionary of product features, a plurality of product features of items corresponding to the one or more related search queries offered in commerce in the electronic marketplace; and
provide, to the remote client, a search refinement tool comprising a display of several product features, of the extracted plurality of product features, that are relevant to the remote client's search query, wherein each of the displayed several product features is configured for selection to cause a further display of at least one of:
search results generated in response to refining, based on which of the displayed several product features is selected, the remote client's search query; or
a refinement of the one or more related search queries that is based on which of the displayed several product features is selected.

2. The system of claim 1, wherein:
the one or more computers are configured to receive the remote client's search query through a network portal that exposes the electronic marketplace to the remote client, and
the one or more computers are further configured to provide the search refinement tool to the remote client though said network portal.

3. The system of claim 1, wherein:
said electronic marketplace is exposed to the remote client by a network portal,
the one or more computers are configured to receive the remote client's search query through a query exploration interface that is distinct from said network portal, and
the one or more computers are further configured to provide the search refinement tool to the remote client though said query exploration interface.

4. The system of claim 3, wherein the one or more computers are configured to:
determine a respective hierarchical relationship between the remote client's search query and each of the one or more related search queries; and
graphically group different subsets of the one or more related search queries within the network portal, each subset corresponding to one of the respective hierarchical relationships.

5. The system of claim 4, wherein different ones of the different subsets of the one or more related search queries have different hierarchical relationships with the remote client's search query, including one or more of:
a parent relationship,
a child relationship, or
a peer relationship.

6. The system of claim 4, wherein the one or more computers are configured to graphically rank the search queries of each grouped subset within the network portal, wherein the search queries are ranked based on one or more other search queries received from one or more other remote clients.

7. The system of claim 3, wherein the one or more computers are configured to compare the remote client's search query and at least some of the one or more related search queries to identify the several product features that are relevant to the remote client's search query.

8. A computer-implemented method, comprising:
performing, by one or more computers comprising one or more hardware processors and memory:

receiving, from a remote client, a search query for locating one or more of a collection of items;

in response to said receiving the remote client's search query, identifying one or more related search queries that are related to the remote client's search query;

generating a dictionary of item features that identifies product features of the collection of items based at least in part on a frequency of search queries for a particular item feature satisfying a frequency occurrence threshold, wherein the dictionary of item features is ranked based on corresponding frequencies of the search queries;

extracting, from the dictionary of item features, a plurality of item features of items corresponding to the one or more related search queries in the collection of items; and providing, to the remote client, a search refinement tool comprising a display of several item features, of the extracted plurality of item features, that are relevant to the remote client's search query, wherein each of the displayed several item features is configured for selection to cause a further display of at least one of:

search results generated in response to refining, based on which of the displayed several item features is selected, the remote client's search query; or a refinement of the one or more related search queries that is based on which of the displayed several item features is selected.

9. The computer-implemented method of claim 8, wherein the method comprises receiving the remote client's search query through a query exploration interface display, wherein the method further comprises providing the search refinement tool to the remote client though that query exploration interface.

10. The computer-implemented method of claim 9, wherein the method comprises:

determining a respective hierarchical relationship between the remote client's search query and each of the one or more related search queries that are related to the remote client's search query; and graphically grouping different subsets of the one or more related search queries within the query exploration interface display, each subset corresponding to one of the respective hierarchical relationships.

11. The computer-implemented method of claim 8, further comprising:

adding additional phrases to the dictionary of item features based on a frequency of subsequent search queries for another particular item feature.

12. The computer-implemented method of claim 10, wherein the method comprises graphically ranking the search queries of each grouped subset within the query exploration interface display.

13. The computer-implemented method of claim 8, wherein the method further comprises comparing the search query submitted by the remote client and at least some of the related search queries to identify the several item features that are relevant to the remote client's search query.

14. A non-transitory computer-readable storage medium, storing program instructions executable on a computer to:

receive, from a remote client, a search query for locating one or more of a collection of items;

in response to the receipt of the remote client's search query, identify one or more related search queries determined to be related to the remote client's search query;

generate a dictionary of item features that identifies product features of the collection of items based at least in part on a frequency of search queries for a particular item feature satisfying a frequency occurrence threshold, wherein the dictionary of item features is ranked based on corresponding frequencies of the search queries;

extract, from the dictionary of features, a plurality of features of items corresponding to the one or more related search queries in the collection of items; and provide, to the remote client, a search refinement tool displaying several features, of the extracted plurality of features, that are determined to be relevant to the remote client's search query, wherein each of the displayed several features is configured for selection to cause a further display of at least one of:

search results generated in response to refining, based on which of the displayed several features is selected, the remote client's search query; or a refinement, based on which of the displayed several features is selected, of the one or more related search queries.

15. The non-transitory computer-readable storage medium of claim 14, wherein said program instructions are executable on a computer to:

receive the remote client's search query through a network portal that exposes the electronic marketplace to the remote client, and provide the search refinement tool to the remote client though said network portal.

16. The non-transitory computer-readable storage medium of claim 14, wherein:

said electronic marketplace is exposed to the remote client by a network portal, and said program instructions are executable on a computer to:

receive the remote client's search query through a query exploration interface that is distinct from said network portal, and provide the search refinement tool to the remote client though said query exploration interface.

17. The non-transitory computer-readable storage medium of claim 16, wherein said program instructions are executable on a computer to:

determine a respective hierarchical relationship between the remote client's search query and each of the one or more related search queries; and graphically group different subsets of the one or more related search queries within the network portal, each subset corresponding to one of the respective hierarchical relationships.

18. The non-transitory computer-readable storage medium of claim 17, wherein different ones of the different subsets of the one or more related search queries have different hierarchical relationships with the remote client's search query, including one or more of:

a parent relationship, a child relationship, or a peer relationship.

19. The non-transitory computer-readable storage medium of claim 16, wherein said program instructions are executable on a computer to compare the remote client's search query and at least some of the one or more related search queries to identify the several product features that are relevant to the remote client's search query.

* * * * *